United States Patent
Udall et al.

(10) Patent No.: US 8,303,187 B2
(45) Date of Patent: Nov. 6, 2012

(54) BEARING ARRANGEMENT

(75) Inventors: Kenneth F. Udall, Derby (GB); Alan R. Maguire, Derby (GB)

(73) Assignee: Rolls-Royce PLC, London (GB)

( * ) Notice: Subject to any disclaimer, the term of this patent is extended or adjusted under 35 U.S.C. 154(b) by 615 days.

(21) Appl. No.: 12/588,441

(22) Filed: Oct. 15, 2009

(65) Prior Publication Data
US 2010/0142871 A1  Jun. 10, 2010

(30) Foreign Application Priority Data

Dec. 8, 2008 (GB) .................................. 0822245.7

(51) Int. Cl.
*F16C 27/00* (2006.01)
*F16C 33/66* (2006.01)
(52) U.S. Cl. ........................................ 384/517; 384/611
(58) Field of Classification Search .................. 384/499, 384/513, 517, 518, 519, 611, 613, 619, 620
See application file for complete search history.

(56) References Cited

U.S. PATENT DOCUMENTS

| | | | |
|---|---|---|---|
| 1,346,417 A * | 7/1920 | Palmgren | 384/517 |
| 1,399,959 A * | 12/1921 | Hanson | 384/517 |
| 3,516,717 A * | 6/1970 | Peterson | 384/517 |
| 3,738,719 A * | 6/1973 | Langner | 384/517 |
| 4,523,864 A | 6/1985 | Walter et al. | |
| 5,074,681 A | 12/1991 | Turner et al. | |
| 5,810,483 A | 9/1998 | Vites | |

FOREIGN PATENT DOCUMENTS

GB  595971  12/1947
GB  1 344 318 A  1/1974

OTHER PUBLICATIONS

European Search Report dated Apr. 1, 2010 for corresponding European Patent Application No. 09 25 2422.

* cited by examiner

*Primary Examiner* — Phillip A Johnson
(74) *Attorney, Agent, or Firm* — Oliff & Berridge, PLC

(57) ABSTRACT

In order to accommodate loading in a number of situations such as with regard to thrusts in a gas turbine engine it is known to provide thrust bearings. These thrust bearings can be large and may be difficult to accommodate. By providing a duplex or multiplex thrust bearing which may be of increased axial length but reduced radial width easier accommodation may be achieved. By providing a thrust element 27 which compromises a balance beam from which extend elastic hinges to a mounting to a fixed bearing frame and ends of bearing races 21, 22 an appropriate thrust response can be achieved dependent upon bearing loads presented through bearing elements 23, 24. By rotation of the balance beam and flexing of the elastic hinges 30, 31, 32 an appropriate bearing load share is achieved.

17 Claims, 3 Drawing Sheets

BEARING ARRANGEMENT

The present invention relates to a bearing arrangement and more particularly to bearing arrangements which provide a thrust bearing in use.

Thrust bearings are used in a wide range of applications including with respect to gearbox shafts, rolling mill rollers, wind and water turbine main rotor mounts, wheel bearings and other situations where a device is required which has extra thrust capacity and multiple bearings are desirable. A particular example of a thrust bearing utilised in accordance with aspects of the present invention is the front bearing housing region of a gas turbine engine.

FIG. 1 provides an illustration of a front bearing housing region of a gas turbine engine. Thus, thrust loads presented on a spool 1 are managed by pressurisation of a rotating seal panel 2 relative to a static member 3. There is clearly air leakage between the members 2, 3 of a seal 100 due to pressure loading of spool 1. An alternative as also illustrated in FIG. 1 is to provide a large thrust bearing 4 which resists and manages the loads presented to the spool 1. In order to achieve a high pressurisation behind the seal created by the association between members 2, 3 it is understood that it may be necessary to provide a dedicated piping system to extract air from a suitable stage or position in the compression stages. Such piping will increase complexity, cost and waste. Furthermore, in view of the temperature of the air extracted it may be necessary to utilise high temperature materials again increasing cost and weight. Leakage flow is a direct penalty with respect to engine performance cycles and an indirect cost if such air flows spoil the compressor entry flow and raise the temperature of the compressor entry air reducing its density.

As indicated, in order to avoid the above problems with a pressurised air seal it is known to provide a large capacity thrust bearing. However, such large capacity thrust bearings have a significant physical size which may be difficult to accommodate within the intermediate bearing housing or other small spaces within machinery such as gas turbine engines. Consequently, large thrust bearings tend to be placed in the front bearing housing as illustrated in FIG. 1 in exchange for a usual roller bearing. Such location utilises significant proportions of the front bearing housing and limits design space and raises the box hub line. It is also difficult and complicated to achieve race retention, accommodate changes in rotor to stator thermal expansion matching and squeeze film design. Furthermore, post fan blade off behaviour can also be changed by such locations. In view of the above it would be advantageous to provide a bearing arrangement in which a thrust bearing can be created and a reduction in particular of radial size achieved.

In accordance with aspects of the present invention there is provided a bearing arrangement comprising a pair of bearings arranged to present respective bearing elements with a thrust loadshare relative to a bearing frame, the arrangement characterised in that an end of each bearing race is associated with a thrust element secured to the bearing frame, the thrust element defined by flanges which extend from a balance beam upon a flexible hinges to respective bearing races or the bearing frame.

Possibly, the arrangement has a number of thrust elements in a cascade of loadshare devices.

Typically, the thrust element is secured to the bearing housing and/or the bearing frame by a weld or bolt association.

Generally, the bearing element is a ball bearing located within a cage between the inner race and the outer race.

Typically, the arrangement is configured in use for load balance between the bearing races across the balance beam.

Typically, shims are placed between the inner bearing races to define a tolerance gap between the left and right inner races. Typically, the arrangement incorporates overlapping cages to ensure positive driving of either bearing during low load conditions.

Typically, the flange bolts are tangentially spaced from the balance beam to avoid a spatial clash.

Possibly, the balance beam is circumferentially continuous around the bearing arrangement.

Possibly, the balance beam is arranged at a 90 degree orientation to the flanges. In such circumstances generally, the flanges are presented upon inclined elastic hinges or wedge cams.

Generally, the balance beam defines a central pivot with a circular part section flange trapped between a pair of bolted mounting flanges.

Possibly, elastic hinges extend between the balance beam and the flanges in such circumstances, advantageously the elastic hinges are integrally formed with the balance beam and/or flanges.

Possibly, there is a plurality of thrust elements in the arrangement. Typically, the plurality of thrust elements are spaced relative to each other and secured to one or more bearing frames. Advantageously the thrust elements are sequentially and/or evenly spaced relative to each other.

Also, in accordance with the aspects of the present invention there is provided a gas turbine engine incorporating a bearing arrangement as described above.

Embodiments of aspects of the present invention will now described by way of example and with reference to the accompanying drawings in which:—

As indicated above in order to manage loading it is known to provide thrust bearings in a number of applications. However in such situations it may be difficult to conveniently accommodate conventional thrust bearing designs within the available space. By aspects of the present invention a duplex bearing arrangement which creates a shared thrust or thrust loadshare is achieved which generally may have a more elongated configuration but has a reduced radial space requirement.

Figure 2:
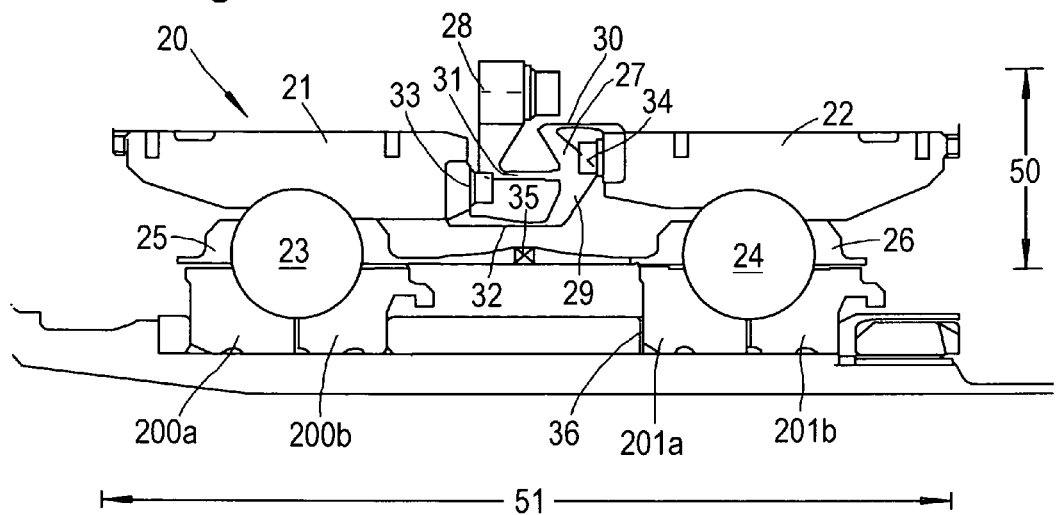
FIG. 2 is a schematic side view of a bearing arrangement in accordance with aspects of the present invention.

FIG. 2 provides a schematic side illustration of a bearing arrangement 20 in accordance with aspects of the present invention. The arrangement 20 comprises a pair of thrust bearings defined by a first bearing race 21 and a second bearing race 22 associated with bearing elements 23, 24 which in turn are located within cages 25, 26 and loaded by inner races 200, 201. The races 21, 22 are associated with a thrust element 27 which in turn is secured to a bearing frame 50 FIG. 2 through a mounting 28.

The thrust element 27 incorporates a balance beam 29 and respective elastic hinges 30, 31, 32 to flange mountings 28, 33, 34 to the bearing frame and to bearing races 21, 22. The configuration of the thrust element 27 described later with regard to FIG. 3.

In view of the above it is understood that the bearing elements 23, 24 in association with the outer races 21, 22 and the inner races 200, 201 create a thrust bearing. Each race 21, 22 is secured to the thrust element 27 through an appropriate fixing. This fixing may be a welded joint, or bolted as illustrated. The respective flanges connect via elastic hinges 30, 31, 32 with the balance beam 29. In such circumstances the flanges 28, 33, 34 can generate a thrust bias force when required through those hinge associations with the balance beam 29. Generally cages 25, 26 are provided which overlap at drive dogs 35 in order to generate a positive drive if one bearing becomes unloaded at a low load condition.

By aspects of the present invention the thrust element 27 creates a proportional loading device in which equal race loads hold balance across the balance beam 29. The loads are transferred by tension through the central hinge formed by the balance beam 29 and the elastic hinge 31 to create thrust. In the illustration as depicted in FIG. 2 the primary load direction is directed towards the right as implied by the outer races skewed bias.

Inner races 200, 201 are assembled with the outer races slightly loaded to the right. The inner race to race gap is measured and a suitable shim 36 inserted to space the inner races to a close tolerance.

Figure 3:
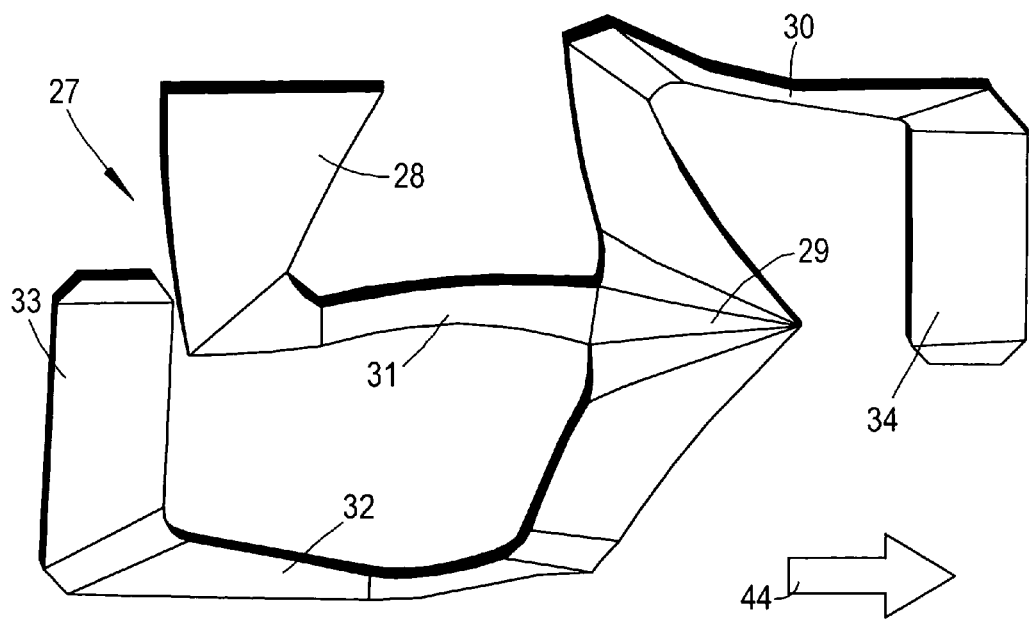
FIG. 3 is a schematic plan view of a thrust balance beam element in accordance with aspects of the present invention; and, FIG. 4 is a schematic front perspective view of a thrust element in accordance with aspects of the present invention.
Figure 4:
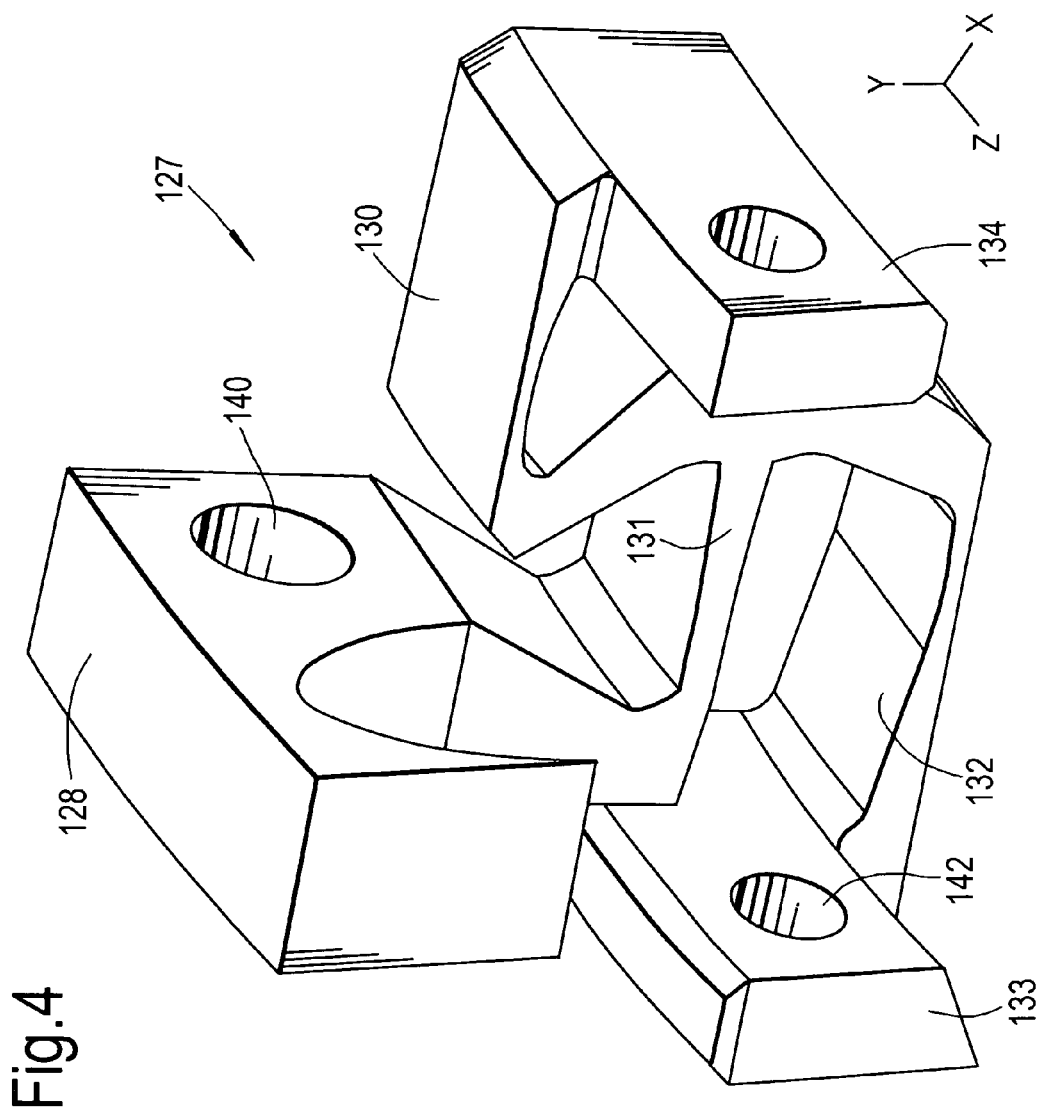

In terms of operation if the residual inner race to race spacing is such that the right bearing contacts first then the right outer race will move to the right and the balance beam 27 will rotate clockwise. FIG. 3 illustrates the thrust element under such loading with deflections greatly exaggerated for clarity. It will be seen that as the balance beam 27 is rotated there is flexing and bending about the hinges 30, 31, 32 with an overall deflection to the right in the direction of the arrowhead 44.

Such deflection of the thrust element 27 results in balance beam 29 rotation which pushes the left bearing race (FIG. 2) to the left bringing it into load contact with the left bearing element 23. As the left bearing element load increases towards that of the right bearing element 24 load level or value it restrains further rotation of the balance beam 29. In such circumstances the thrust element 27 stabilises with a small bearing load imbalance depending upon the initial shim tolerance.

If the left bearing contacts first then the balance beam 29 will rotate anti-clockwise and give a similar but reversed general behaviour to that described above.

As indicated above FIG. 3 provides a schematic plan view of a thrust element 27 and distortion in accordance with aspects of the present invention. It should be noted that the beam element is generally formed from a cast or otherwise shaped component to define the central balance beam 29 with hinges 30, 31 and 32 extending from that beam in order to create the desired thrust biased response.

Figure 1:
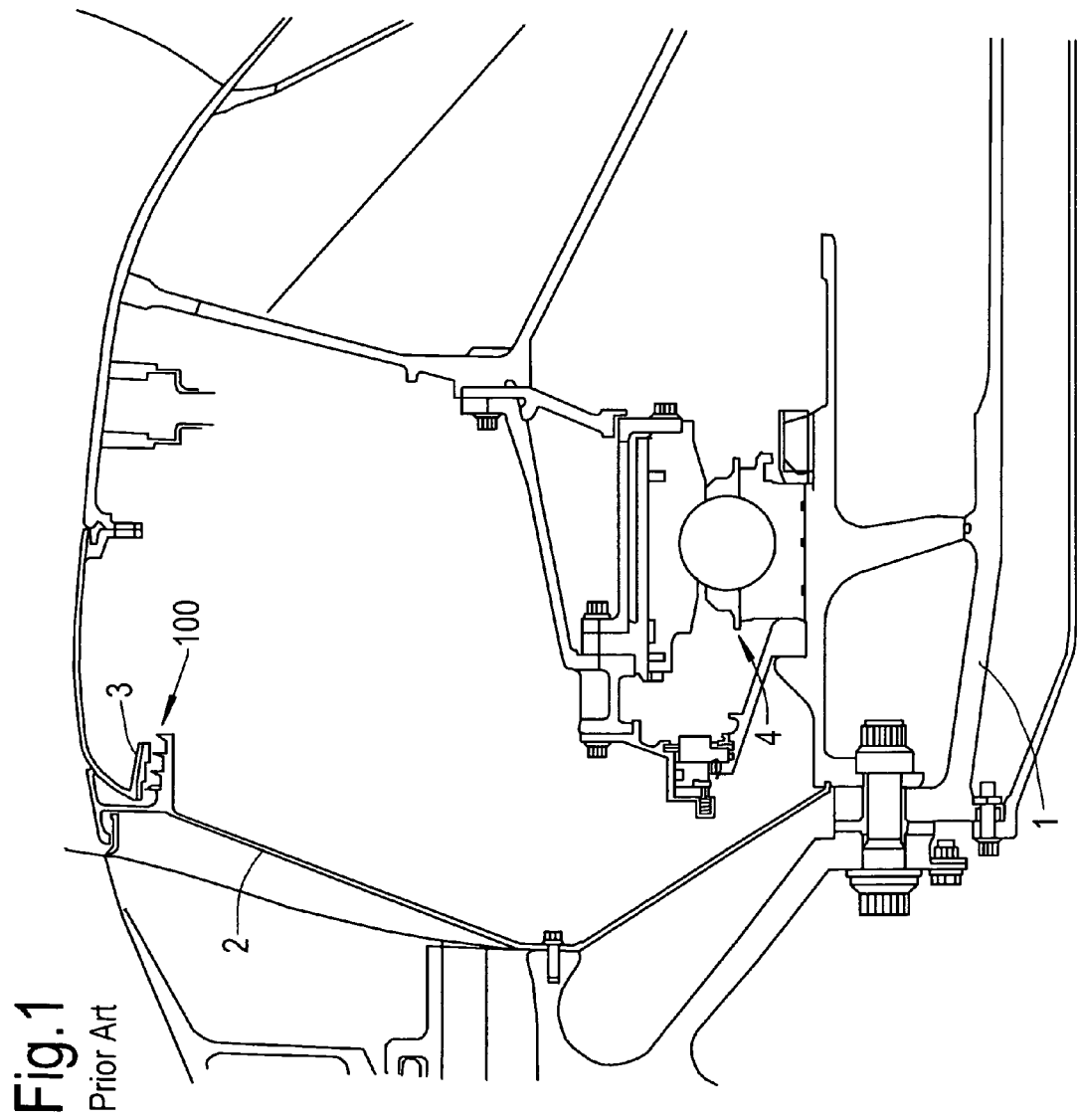

Again referring to FIG. 2, the combination of the races 21, 22, 200, 201 with associated bearing elements 23, define a twin pack bearing approximately in context equivalent to a large thrust bearing. It should be noted that the radial extent 50 of the bearing arrangement 20 is generally reduced whilst typically in comparison with the arrangement as depicted in FIG. 1 the axial length 51 has increased. As illustrated the outer race sections 21, 22 are of a notional size and may be overlarge as depicted but nevertheless for illustration purposes allow illustration of the reduced depth in terms of radius 50 of a bearing arrangement 20 in accordance with aspects of the present invention.

A particular problem with providing a thrust element 27 in accordance with aspects of the present invention is the potential clash between the element 27 profile and heads of the race 21, 22 attachment bolts in use. It should be noted the element 27 is secured to substantially opposed ends of the races 21, 22. In such circumstances gaining access to allow bolts to secure the element 27 to the races 21, 22 may be difficult. In such circumstances as illustrated in FIG. 5 a thrust element 127 may be created. The thrust element 127 is segmented such that the beams are presented tangentially spaced from the mounting bolts utilised for association of the element 127 with the bearing races and mountings to a bearing frame in accordance with aspects of the present invention.

The thrust element 127 as previously comprises elastic hinges 130, 131, 132 which extend to flange mountings respectively 128, 133, 134 as described previously. The mountings 128, 133, 134 incorporate bolt apertures 140, 141, 142 to allow the thrust element 127 to be secured appropriately.

By provision of an arrangement as depicted with tangential spacing between the bolted flanges mounting 133, 134, and the bolt flange mounting 128 greater access is available for providing adequate bolt insertion and torque control from above as well as possibly from below when building a bearing arrangement in accordance with aspects of the present invention is achieved.

A further feature of aspects of the present invention is if the flanges of the thrust element in accordance with aspects of the present invention can be arranged to be positioned outside of the bearing housing defining the outer races then a circumferentially continuous balance beam with elastic hinges can be facilitated. Such an arrangement will increase the thrust element capacity in terms of thrust bias generated. However, in such circumstances there is generally a trade off between manufacturing precision, operating stress levels and initial setting tolerance or operating range for the thrust element in accordance with aspects of the present invention.

It is understood in use squeeze films are arranged to make the radial journal loads independent of the thrust element and so provide a needed outer race deflection in an axial direction for a thrust balance in use.

Aspects of the present invention provide a bearing arrangement which has a compact size and which is provided with minimal bearing design size, bearing element size and bearing arrangement radius whilst maximising total thrust bearing capacity in terms of shared thrust load or loadshare.

It is understood that by particular shaping of the thrust element utilised in accordance with aspects of the present invention different responses can be achieved. Each flange to balance beam connection can be tuned with horizontal elements achieving sufficient axial stiffness and rotational flexibility to act as elastic hinges. By creating elastic hinges and so tuning between the balance beam and the flanges it is understood that there will be an elimination of hinge pins which may wear in use. In such circumstances the thrust element in accordance with aspects of the present invention is typically a relatively simple monolithic device.

The mounting hinges and associated mounting flanges extending from the balance beams are tuned sections to give adequate beam and therefore overall device axial stiffness in use to achieve the thrust bias response as indicated.

Through multiple parallel loadpaths it is understood that individual element failure tolerance is achieved although the alternative continuous hoop balance beam would have reduced edge effects.

Rather than provide a balance beam which extends circumferentially it is possible to provide a balance beam which is configured and orientated at 90 degrees to the flanges about the flexible hinges. In such circumstances the flexible hinges are inclined or have a wedged cam in order to translate the differential axial movement into a differential vertical movement. The balance beam has a central pivot pole to which the flange to the mounting for the bearing frame is attached. Such a central pivot could be achieved through a central part of the flange being trapped between a pair of bolted mounting flanges to allow flexing about the circular part thereby trapped.

Embodiments of aspects of the present invention are described above with regard to a gas turbine engine but it will also be appreciated that thrust bearings are utilised in a wide range of other environments with respect to machinery.

Generally, the thrust element in accordance with aspects of the present invention will be made from a suitable material such as a metal and configured to achieve a desired flexible hinge operation between the flanges to develop the thrust balance in accordance with aspects of the present invention. The thrust element may be formed from a similar material from which traditional thrust elements have been formed in order to withstand incident temperatures.

As indicated above generally, the flanges and mountings will be secured through bolts or welds however other alternative approaches such as adhesives and interference locks may also be utilised where appropriate.

As described above, the cages 25, 26 provide tangential retention for the rolling balls. The cage overlap 35 provides a positive drive if one bearing becomes unloaded at a low load condition. In such circumstances the bearing elements are appropriately presented in all circumstances.

Modifications and alterations to aspects of the present invention will be appreciated by persons skilled in the technology thus the overall configuration of the thrust element may alter in terms of thickness of the flange materials and shaping and orientation of the materials in order to create the thrust response as required. Furthermore, the thrust element may be made from one or more different materials in order to create the desired deformation responses in accordance with aspects of the present invention.

The invention claimed is:

1. A bearing arrangement comprising a pair of bearings having races arranged to present respective bearing elements with a thrust loadshare relative to a bearing frame, wherein an end of each race engages a thrust element that is secured to the bearing frame, the thrust element comprising a balance beam, mounting flanges and elastic hinges, the elastic hinges extend from the balance beam to the flanges securing respective races or the bearing frame.

2. The bearing arrangement of claim 1 wherein the thrust element is secured to the bearing race and/or the bearing frame by a weld or bolt association.

3. The bearing arrangement of claim 1 wherein the bearing element is a ball bearing located within a cage between an inner race and an outer race of the races.

4. The bearing arrangement of claim 1 wherein the arrangement is configured in use for load balance between the races across the balance beam.

5. The bearing arrangement of claim 1 wherein shims are associated with inner races to define a tolerance gap between a left and a right side race.

6. The bearing arrangement of claim 1 wherein the arrangement incorporates overlapping cages to ensure positive driving of either bearing during low load conditions.

7. The bearing arrangement of claim 1 wherein bolts through the flanges and the balance beam are tangentially spaced.

8. The bearing arrangement of claim 1 wherein the balance beam is circumferentially continuous around the bearing arrangement.

9. The bearing arrangement of claim 1 wherein the balance beam is arranged at a 90 degree orientation to the flanges.

10. The bearing arrangement of claim 1 wherein the elastic hinges comprise inclined elastic hinges or wedge cams.

11. The bearing arrangement of claim 1 wherein the balance beam defines a central pivot with a circular part section flange trapped between a pair of bolted mounting flanges.

12. The bearing arrangement of claim 1 wherein multiple bearings housings are cascaded via several loadshare elements to a single thrust location.

13. The bearing arrangement of claim 1 wherein the elastic hinges are integrally formed with the balance beam and/or the flanges.

14. The bearing arrangement of claim 1 wherein there is a plurality of thrust elements in the arrangement.

15. The bearing arrangement of claim 14 wherein the plurality of thrust elements are spaced relative to each other and secured to the bearing frame.

16. The bearing arrangement of claim 15 wherein the thrust elements are sequentially and/or evenly spaced relative to each other.

17. A gas turbine engine incorporating the bearing arrangement of claim 1.

* * * * *